United States Patent
Blanc

(10) Patent No.: US 7,565,861 B2
(45) Date of Patent: Jul. 28, 2009

(54) DEVICE FOR PRODUCTION OF A BEVERAGE BY INFUSION

(75) Inventor: Jean-Pierre Blanc, Nice (FR)

(73) Assignee: Compagnie Mediterraneenne des Cafes S.A., Carros (FR)

( * ) Notice: Subject to any disclaimer, the term of this patent is extended or adjusted under 35 U.S.C. 154(b) by 645 days.

(21) Appl. No.: 10/561,513

(22) PCT Filed: Jun. 16, 2004

(86) PCT No.: PCT/EP2004/051137

§ 371 (c)(1),
(2), (4) Date: Dec. 20, 2005

(87) PCT Pub. No.: WO2004/112553

PCT Pub. Date: Dec. 29, 2004

(65) Prior Publication Data

US 2007/0095213 A1    May 3, 2007

(30) Foreign Application Priority Data

Jun. 25, 2003  (FR)  ................................. 03 50254

(51) Int. Cl.
*A47J 31/00*  (2006.01)

(52) U.S. Cl. .................. 99/308; 99/302 R; 99/300; 99/295; 426/433

(58) Field of Classification Search .................. 99/300, 99/302 P, 302 R, 295, 308, 309; 426/433
See application file for complete search history.

(56) References Cited

U.S. PATENT DOCUMENTS

| | | | |
|---|---|---|---|
| 3,565,641 A * | 2/1971 | King | 99/302 P |
| 5,309,820 A * | 5/1994 | Baxter et al. | 99/280 |
| 5,312,637 A | 5/1994 | Midden | |
| 5,868,062 A * | 2/1999 | Enomoto | 99/282 |
| 6,595,108 B1 * | 7/2003 | Blanc | 99/295 |

FOREIGN PATENT DOCUMENTS

EP    1 264 568    12/2002

* cited by examiner

*Primary Examiner*—Reginald L Alexander
(74) *Attorney, Agent, or Firm*—Young & Thompson

(57) ABSTRACT

A device for production of a beverage by infusion of a ground substance for infusion includes an infusion chamber (2), for housing the ground product, a hot water circuit through the infusion chamber (2) and elements for circulating the hot water in the circuit. The device includes elements for reversing the flow of the hot water circuit through the infusion chamber (2).

10 Claims, 2 Drawing Sheets

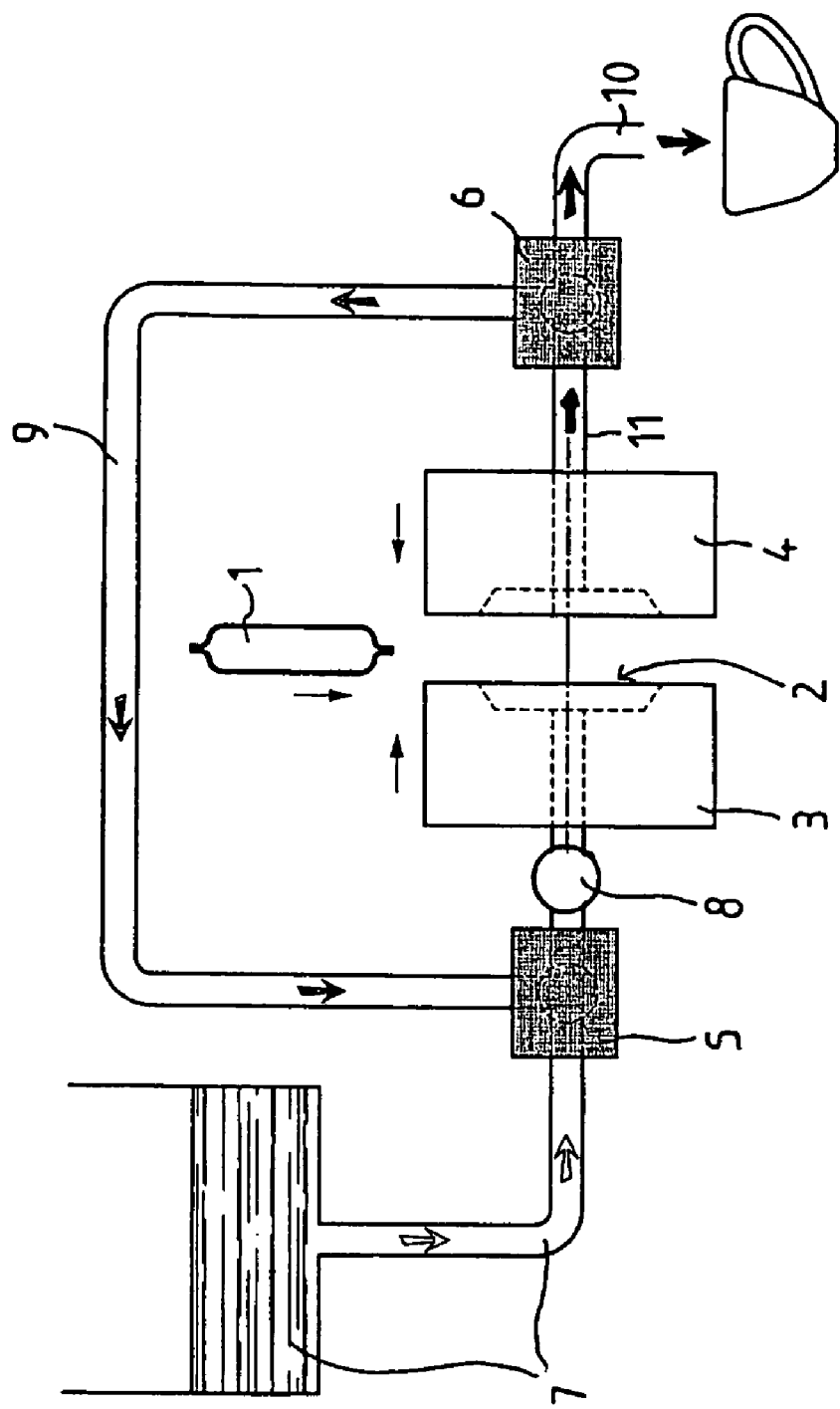
[Fig. 001]

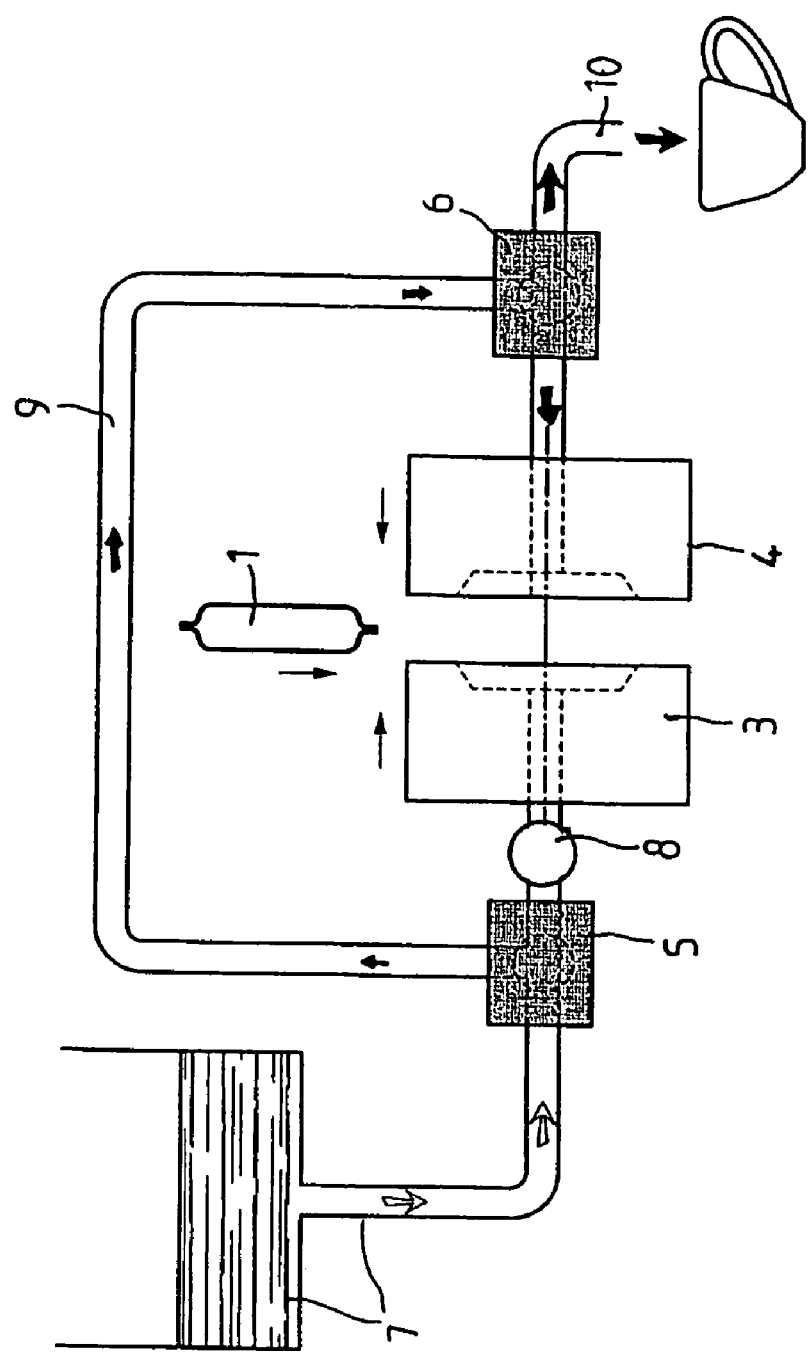
[Fig. 002]

US 7,565,861 B2

DEVICE FOR PRODUCTION OF A BEVERAGE BY INFUSION

This is a 371 National Stage application of International application no. PCT/EP2004/051137, filed Jun. 16, 2004, which claims priority to French application no. 03/50254, filed Jun. 25, 2003. The entire contents of the above-referenced applications are hereby incorporated by reference in their entirety.

BACKGROUND OF THE INVENTION

The present invention relates to a device for production of a beverage by infusion and a coffee machine equipped with such a device.

The invention will be applied in the manufacture of coffee machines of the type used to produce individual beverages, or in larger quantities for hotel or professional use. In particular, the invention applies to coffee machines using ground coffee in the form of ready-to-use prepackaged doses, also called capsules or "pods", such as envisaged in document WO-A-95/07041.

Document U.S. Pat. No. 5,312,637 concerning a coffee machine with an infusion chamber and a circuit for injecting hot water through the infusion chamber is known. The beverage thus produced by infusion is evacuated through an outlet. Moreover, this document describes a return circuit for the beverage from the outlet part to the inlet of the chamber in order to carry out several successive infusions.

A disadvantage of the machine according to this former technology is that the quality of the extracted liquid declines considerably after the first passage of liquid through the infusion chamber. As a result, recirculation is not very effective for extracting all the flavors contained in the ground product.

The present invention overcomes this disadvantage and to do this describes a device for the producing beverages and an improved coffee machine.

To do this, according to the invention, hot water can be circulated through the infusion chamber in both directions. This inversion ensures that hot water running into the infusion chamber is better distributed so as to extract the maximum amount of the aromatic components.

It will be noted that in the existing devices, and in particular the one covered by U.S. Pat. No. 5,312,637, ground coffee has a strong tendency to compact after the first passage of water, and this even more so as the extraction pressure increases.

Moreover, when first circulated in the infusion chamber, water has a tendency to create a preferred path (in particular following the distribution of the ground product in the chamber, along the edges of the chamber, and the point(s) at which the water is injected into the infusion chamber). The path followed by the water on its first passage tends to be repeated during the next passage.

On the contrary, the present invention avoids this tendency so that the passage of water is better distributed through the infusion chamber.

This optimizes the extraction which can be faster and allow the delivery of the maximum flavors contained in the ground product.

Other aims and advantages will appear during the description of a preferred embodiment which follows, which is however not restrictive.

SUMMARY OF THE INVENTION

The invention relates to a device for production of a beverage by infusing a ground product, and comprising an infusion chamber able to receive the ground product, a hot water circuit passing through the aforementioned infusion chamber, and means for circulating the hot water in the circuit. According to the invention, this device has means for reversing the circulation of hot water through the infusion chamber.

According to preferred but non-restrictive possibilities, this device is such that:

the means used for circulation are a pump whose direction of operation is controlled in order to create the means for reversing the flow of hot water through the infusion chamber, the hot water circuit includes an extraction circuit passing through the infusion chamber and a peripheral circuit parallel to the extraction circuit between an inlet valve upstream of the infusion chamber, and an outlet valve downstream of the infusion chamber, the aforementioned valves being configured to allow closed loop circulation in the extraction circuit and the peripheral circuit, the inlet valve has a line connected to the hot water supply, the outlet valve has a line connected to the beverage outlet, the extraction circuit and the peripheral circuit have a total volume which corresponds to that of beverage to be produced.

The invention also concerns a coffee machine which can be used with prepackaged ground coffee characterized in that it includes a device according to the invention.

The invention also relates to a process for production of a beverage by infusion of a ground product, in which the ground product is introduced into an infusion chamber and hot water circulated through the aforementioned infusion chamber, characterized in that during the production of a beverage, the hot water circulation in progress is stopped and the direction of circulation through the infusion chamber is reversed.

The attached drawings are given as examples of the invention and are not restrictive. They only represent one embodiment of the invention and will enable it to be easily understood.

BRIEF DESCRIPTION OF THE DRAWINGS

FIG. 1 is a diagram of an embodiment of the invention configuration with a first direction of circulation.

FIG. 2 illustrates this embodiment in a second direction of circulation.

DETAILED DESCRIPTION OF THE INVENTION

For the remainder of this description, an embodiment of the invention using prepackaged doses 1 in the form of capsules or "pods" containing ground coffee will be described by reference to the drawings. In particular, prepackaged doses of the type presented in publication WO-A-95/07041 may be used. It is also possible to use prepackaged doses without peripheral reinforcing, less rigid or else capsules or "pods". Of course, the invention, also applies to unpackaged ground substances.

In a preferred embodiment, the infusion chamber consists of two mobile parts 3, 4 approaching or moving apart and/or rotating in order to open and close the infusion chamber, depending on the phase of the operation. Concerning this mobility, explicit reference is made here to the mobility described in documents WO-A-95/07041, WO-A 95/17121 or publications WO-A 00/38558 and WO-A 00/44268. The introduction and ejection phases, as well as the phases of opening or closing of the chamber may comply with those presented in this prior art.

FIGS. 1 and 2 show the case of two parts 3, 4 each one ready to form a part of the volume of infusion chamber 2 and ready to be brought closer or moved away one from the other by a traversing movement to open and close infusion chamber 2.

A hot water circuit is also shown, part of which, here called extraction circuit 11, crosses infusion chamber 2. Upstream of extraction circuit 11, the hot water circuit is connected to a hot water supply 7 which is only shown here schematically for the purpose of the explanation. A conventional hot water supply system may be used including a cold water tank, a boiler and a boiler outlet capable of feeding the injection circuit with hot water.

Still in a conventional manner, the circuit includes part of outlet 10 capable of delivering the beverage produced.

According to the invention, there are means for reversing the circulation of hot water through the infusion chamber.

In the embodiment described here, these means are a pump 8 placed in the hot water circuit and able to be controlled in both directions in order to reverse the direction of circulation.

As an indication, pump 8 is positioned upstream of infusion chamber 2. It can be controlled manually (the user determines the direction of water circulation using a switch) or be automated.

In the illustrated example, in addition to extraction circuit 11, the water circuit includes a peripheral circuit marked 9 which is able to form part of the circulation parallel to extraction circuit 11. Parts 11 and 9 of the water circuit meet upstream of infusion chamber 2 and downstream of aforementioned chamber 2. More exactly, an inlet valve 5 is provided to connect extraction circuit 11 and peripheral circuit 9 and to connect hot water supply 7. An outlet valve 6 is shown downstream from infusion chamber 2, to connect up extraction circuit 11, peripheral circuit 9 and beverage outlet 10.

Still in a preferred embodiment, the total volume of extraction circuit 11 and peripheral circuit 9 have approximately the same volume as that of the beverage to be produced.

Below is a possible way for the device subject of the invention to operate.

As shown in FIG. 1, hot water from supply 7 is circulated by the action of pump 8 in order to circulate the water through infusion chamber 2 in the direction of the arrow shown on extraction circuit 11 on FIG. 1. Valves 5 and 6 are then configured to orient the beverage thus partially produced in peripheral circuit 9.

Valve 6 is such that outlet 10 is not open. By configuring valves 5 and 6 in order to constitute a closed loop with extraction circuit 11 and peripheral circuit 9, circulation through infusion chamber 2 can take place several times. Moreover, by reversing the direction of pump 8, this circulation can take place in the opposite direction.

When a new circulation is completed, valve 6 opens towards outlet 10 in order to discharge the beverage.

The result of this inversion is shown in FIG. 2.

By controlling valves 5, 6 and pump 8, the number of circulations and their direction can be easily selected. The cycles can also be reversed.

REFERENCES

1. Prepackaged dose
2. Infusion chamber
3. Moving part
4. Moving part
5. Inlet valve
6. Outlet valve
7. Water supply
8. Pump
9. Peripheral circuit
10. Beverage outlet
11. Extraction circuit

The invention claimed is:

1. A device for production of a beverage by infusion of a ground product, the device comprising:
    an infusion chamber (2) able to receive the ground product,
    a circuit of hot water crossing the infusion chamber (2), and
    a means for circulating the hot water in the circuit,
    wherein the circulation means is reversible so that the hot water can be circulated through the infusion chamber (2) during beverage production in the opposite direction.

2. The device according to claim 1, in which the circulation means is a pump (8) whose direction of operation is controlled so as to form the means for reversing the hot water circulation through infusion chamber (2).

3. A coffee machine for use with prepackaged doses (1) of ground coffee, coffee machine comprising the device according to claim 1.

4. A device for production of a beverage by infusion of a ground product, the device comprising:
    an infusion chamber able to receive the ground product,
    a circuit of hot water, wherein the hot water circuit includes an extraction circuit (11) crossing the infusion chamber (2) and a peripheral circuit (9) parallel to the extraction circuit (11) between an inlet valve (5), upstream of the infusion chamber (2), and an outlet valve (6), downstream of the infusion chamber (2), wherein the inlet and outlet valves (5, 6) are configured to allow closed loop circulation in the extraction circuit (11) and the peripheral circuit (9).

5. The device according to claim 4, wherein the inlet valve (5) has a line connected to a hot water supply (7).

6. The device according to claim 5, wherein the outlet valve (6) has a line connected to a beverage outlet (10).

7. The device according to claim 4, wherein the extraction circuit (11) and the peripheral circuit (9) have an overall volume corresponding to that of the beverage to be produced.

8. A process for producing a beverage by infusion of a ground product, in which the ground product is introduced into an infusion chamber (2) and hot water is circulated through the infusion chamber (2), wherein, during the production of the beverage, the circulation of hot water is stopped and the direction of the circulation through the infusion chamber (2) is reversed.

9. A device for production of a beverage by infusion of a ground product, the device comprising:
    an infusion chamber (2) able to receive the ground product,
    a circuit of hot water crossing the infusion chamber (2), and
    a means for circulating the hot water in the circuit,
    wherein the circulation means is a pump that is adapted to be reversible to reverse the hot water circulation through the infusion chamber (2) during beverage production,
    wherein the hot water circuit includes an extraction circuit (11) crossing the infusion chamber (2) and a peripheral circuit (9) parallel to the extraction circuit (11) between an inlet valve (5), upstream of the infusion chamber (2), and an outlet valve (6), downstream of the infusion chamber (2), wherein the inlet and outlet valves (5, 6) are configured to allow closed loop circulation in the extraction circuit (11) and the peripheral circuit (9).

10. The device according to claim 9, wherein the inlet valve (5) has a line connected to a hot water supply (7).

* * * * *